United States Patent
Sawyer et al.

(10) Patent No.: US 12,147,969 B2
(45) Date of Patent: Nov. 19, 2024

(54) METHOD FOR MANAGING CURBSIDE USE BY VEHICLES

(71) Applicants: Michael Sawyer, Chester, VA (US); Lawrence J. Marcus, Falls Church, VA (US); Matthew Roe, Brooklyn, NY (US)

(72) Inventors: Michael Sawyer, Chester, VA (US); Lawrence J. Marcus, Falls Church, VA (US); Matthew Roe, Brooklyn, NY (US)

( * ) Notice: Subject to any disclaimer, the term of this patent is extended or adjusted under 35 U.S.C. 154(b) by 0 days.

(21) Appl. No.: 18/165,473

(22) Filed: Feb. 7, 2023

(65) Prior Publication Data

US 2023/0186275 A1    Jun. 15, 2023

Related U.S. Application Data

(62) Division of application No. 16/774,162, filed on Jan. 28, 2020, now Pat. No. 11,580,521.

(60) Provisional application No. 62/797,530, filed on Jan. 28, 2019.

(51) Int. Cl.
| | |
|---|---|
| G06Q 30/00 | (2023.01) |
| G01C 21/34 | (2006.01) |
| G01C 21/36 | (2006.01) |
| G06Q 20/32 | (2012.01) |
| G06Q 30/0207 | (2023.01) |

(52) U.S. Cl.
CPC ....... *G06Q 20/327* (2013.01); *G01C 21/3476* (2013.01); *G01C 21/3685* (2013.01); *G01C 21/3691* (2013.01); *G06Q 30/0207* (2013.01)

(58) Field of Classification Search
None
See application file for complete search history.

(56) References Cited

U.S. PATENT DOCUMENTS

| | | |
|---|---|---|
| 9,519,290 B2 | 12/2016 | Kojo et al. |
| 10,473,470 B2 | 11/2019 | Iagnemma et al. |
| 2005/0280555 A1* | 12/2005 | Warner ............ G08G 1/14 705/13 |
| 2007/0233369 A1 | 10/2007 | Ng |
| 2012/0095790 A1 | 4/2012 | Stefik |
| 2012/0188101 A1* | 7/2012 | Ganot ............ G07B 15/02 340/932.2 |
| 2014/0012498 A1 | 1/2014 | Gustafson |
| 2014/0236684 A1 | 8/2014 | Nozawa |
| 2014/0372155 A1* | 12/2014 | Wang ............ G06Q 10/02 705/5 |
| 2015/0006012 A1 | 1/2015 | Kammel et al. |
| 2016/0063863 A1* | 3/2016 | Stefik ............ G08G 1/147 340/932.2 |
| 2016/0107646 A1 | 4/2016 | Kolisetty |
| 2016/0370194 A1 | 12/2016 | Colijn et al. |
| 2017/0052036 A1 | 2/2017 | Uno |

(Continued)

*Primary Examiner* — Matthew T Sittner
(74) *Attorney, Agent, or Firm* — Blank Rome LLP

(57) ABSTRACT

A method for managing curbside use by connected and/or autonomous vehicles that includes executing instructions of one or more computing devices having a processor that integrates at least a navigation component, an asset verification component, and a curbside management component, that generate recommended curbside access destinations for a vehicle associated with the customer and one of which is selected as the final curbside destination for the vehicle.

22 Claims, 7 Drawing Sheets

(56) References Cited

U.S. PATENT DOCUMENTS

| | | |
|---|---|---|
| 2017/0116664 A1 | 4/2017 | Lee |
| 2017/0123429 A1 | 5/2017 | Levinson et al. |
| 2017/0132334 A1 | 5/2017 | Levinson et al. |
| 2018/0105174 A1 | 4/2018 | Russell et al. |
| 2018/0268322 A1 | 9/2018 | Liu |
| 2018/0336784 A1 | 11/2018 | Liu |
| 2019/0056733 A1* | 2/2019 | Ferguson .............. G05D 1/0212 |
| 2019/0137290 A1* | 5/2019 | Levy ...................... B60Q 1/507 |
| 2019/0188800 A1 | 6/2019 | Slusar |
| 2019/0265698 A1 | 8/2019 | Tod |
| 2020/0042620 A1 | 2/2020 | Aggarwal |
| 2020/0124428 A1* | 4/2020 | Hamilton ............... G06Q 10/02 |
| 2020/0132482 A1 | 4/2020 | Beaurepaire |
| 2020/0173808 A1 | 6/2020 | Beaurepaire |

\* cited by examiner

720

CURBSIDE MANAGEMENT

- RECOMMENDED CURBSIDE DESTINATION OPTIONS WITH FEES
  - DISABLED
  - CLOSEST
  - MODERATE PRICE
  - CHEAPEST
  - PEAK PERIOD SURCHARGE
  - NUMBER OF OCCUPANTS
- ESTIMATED CURBSIDE AVAILABILITY
- ADVERTISEMENT

FIG. 7C

FROM PAYMENT SYSTEM:

- SELECTED OPTION FEE
- PEAK PERIOD SURCHARGE
- ADVERTISING DISCOUNT
- DISABLED DISCOUNT
- OTHER OWNER POLICIES

METHOD FOR MANAGING CURBSIDE USE BY VEHICLES

CROSS REFERENCE TO RELATED APPLICATIONS

This application is a divisional of U.S. application Ser. No. 16/774,162, filed on Jan. 28, 2020, entitled Curbside Management System For Connected and Autonomous Vehicles, which claims priority to U.S. provisional application Ser. No. 62/797,530, filed on Jan. 28, 2019, the subject matter of each of which is incorporated herein by reference.

FIELD OF THE INVENTION

The present application relates to a system and method for optimizing curbside use by connected and autonomous vehicles that can be managed and monetized by the owner (e.g. public or private entity).

BACKGROUND

The future of the curb space on streets is not to park automobiles, it will be for docking an array of vehicles. No technology/management system exists for street owners to manage this change. The allocation of curbside space to vehicles presents a challenge to infrastructure owners and operators. Curbside space allocation technology has historically been limited to a) curbside regulations posted on physical signs and b) parking meters, including multispace meters and 'virtual' multispace meters more commonly known as pay-by-phone systems. These systems have distinct limitations because they are not dynamic (unresponsive to demand at a specific time) and do not communicate with vehicles or drivers until the driver arrives at the desired destination.

As curbside demand has increased, the result has been dysfunction at the curb, with problems, such as double-parking, lane blockages, and related issues multiplying across the U.S. Vehicles competing for curb space extends beyond the private automobile and app-hailed transportation services, with demand from emergency vehicles, vending trucks, transit vehicles, taxis, commercial loading, and other modes. Further, space must be preserved for access to fire hydrants, crosswalks, pedestrians, handicapped parking, parklets, peak demand travel lane capacity (such as curb running turn lanes), and on-street docking for shared mobility modes (bicycles, scooters, etc.).

The focus of the transportation industry has been on maximizing access by travelers, as seen in the rise of app-hailed and electrified transportation services, carshare, bikeshare, scooters, and similar reservable fleets. However, these services all compete for the same, physically limited docking space along the curb, and currently do not pay for the docking time spent occupying the curb during drop-offs and pickups. The urban curbside, where vehicles are permitted to stop, is therefore a highly sought-after congestible resource. This competition and dysfunction will be magnified exponentially by connected and autonomous vehicles.

An autonomous vehicle is an autonomously directed vehicle that receives and executes, without human action, commands to make a sequence of movements. The received commands may be supplied by sensors and may be the result of processing equipment or controller that is part of the vehicle. Examples of the conventional methods for navigating and routing autonomous vehicles may be found in U.S. Pat. Nos. 10,473,470 and 9,519,290; and U.S. Published Application Nos. 2018/0105174, 2017/0132334, 2017/0123429, 2016/0370194, and 2015/0006012, the subject matter of each of which is herein incorporated by reference.

Autonomous vehicles will exacerbate these congestion problems further because, by default, the least expensive option for an automated vehicle operator or owner will be for it to simply wait in the place where it last dropped off a passenger, thereby causing congestion with other vehicles and/or passengers trying to reach the same destination. As such, vast inefficiencies in the use of curbside space is anticipated.

Consider, for example, an urban area with countless autonomous vehicles programmed towards a popular destination, such as a major transit hub or special event during a limited time window (start or end of a special event, morning peak hour traffic, etc.), saturating desired premium curb space, disrupting vehicular traffic, pedestrians, bicyclists, transit vehicle access to stops/shelters. Combine that programmed layer of autonomous vehicles with app-hailed transportation services and the other demands listed above, and city streets simply cannot function. And while traveler mobility and functionality is essential, emergency vehicle access is critical. Emergency vehicles must have direct, timely, and sufficient access to curb space, functioning in real-time. Together, this specific form of congestion—the congested curb—leads to safety risks (including visibility and sightlines), inefficiency in the use of space, and loss of potential jurisdiction revenue unless this space is prioritized by cities, priced to control demand and create turnover, or other limits are placed on their use.

Therefore, a need exists for technology that combats curbside vehicle congestion and that provides infrastructure owners with the ability to prioritize the use of curb space dynamically, sell time at the curb to potential customers in real-time, and allow potential customers to reserve time at specific curbside spaces.

SUMMARY

Accordingly the present invention may provide a curbside management system for managing curbside use by vehicles that comprise one or more owner computing devices that each include at least one memory that has executable instructions and at least one processor programmed to execute the instructions, and the processor is in communication with one or more customers via the internet. The processor integrates at least a navigation component, an asset verification component, and a curbside management component, configured to generate recommended curbside access destinations for a vehicle associated with the customer, and which are communicated to the customer for selection of a one of the recommended curbside access destinations as a final curbside destination for the vehicle. And the processor incorporates a payment component for calculating fees associated with one or more of the recommended curbside access destinations and the final curbside destination.

In some embodiments of the system, the navigation component is configured to generate a route to the final destination from a current location of the vehicle; the vehicle is an autonomous vehicle and the processor is in communication with a controller of the autonomous vehicle to direct the autonomous vehicle to the final destination via the route generated by the navigation component; the vehicle is a non-autonomous vehicle and the customer communicates with the processor via a smart phone or computer; and/or the recommended curbside access destinations are based at least in part on a requested destination by the customer and an estimated dwell time of the vehicle.

In other embodiments of the system, the recommended curbside access destinations are part of a limited curbside space and the curbside management component is configured to optimize the use of the limited curbside space; the curbside management component is configured to dynamically prioritize the limited curbside space based upon a set of priorities determined by the owner; the set of priorities include one or more of accessibility, safety, modal preference, demand and peak use, disabled occupant, and number of occupants; the curbside management component is configured to communicate with a municipal emergency system and the recommended curbside destinations are based at least in part on information received from the emergency system; the asset verification component is configured to collect and communicate real-time activity at the curbside, quantify any customer demands on the use of the curbside, and archive the information for analysis and optimization by the curbside management component; and/or the payment component is configured to charge for one or more of a selected option fee, a peak period surcharge, an advertising discount, and a disabled discount and other policies as determined by the owner.

The present invention may also provide a curbside management system for managing curbside use by autonomous vehicles that comprises one or more computing devices that each include a memory that has executable instructions and one or more processors for executing the instructions, and the processor is in communication with a controller of one or more of the autonomous vehicles via the internet. The processor integrates at least a navigation component, an asset verification component, and a curbside management component configured to generate recommended curbside access destinations and the processor communicates a route to the autonomous vehicle, via the controller thereof, to one of the recommended curbside access destinations as a final curbside destination.

In certain embodiments of the system, the processor incorporates a payment component for calculating fees associated with one or more of the recommended curbside access destinations and the final curbside destination; the processor directs the autonomous vehicle via the controller thereof to the final destination by a route generated by the navigation component; and/or the recommended curbside access destinations are part of a limited curbside space and the curbside management component is configured to optimize the use of the limited curbside space.

The present invention may yet further provide a method for managing curbside use by vehicles, comprising the steps of: executing instructions of one or more computing devices, each computing device having at least one memory and at least one processor, to perform the following operations: prompting a customer to request curbside use in which the customer inputs at least a destination address and an estimated dwell time for a connected vehicle associated with the customer, generating recommended curbside access destinations based at least in part on the destination address and the estimated dwell time, and generating an estimated fee for each of the recommended curbside access destinations, communicating the recommended curbside access destinations and the estimated fees to the customer, prompting the customer to select one of the recommended curbside access destinations as a final curbside destination, and generating a route from a current location of the vehicle to the final curbside destination.

In some embodiments of the method, the operations to be performed include verifying payment information inputted by the customer, verifying in real-time the availability of the final curbside destination while the vehicle is in route thereto; and/or determining an alternative curbside destination if the final curbside destination is not available.

In one embodiment of the method, the connected vehicle is an autonomous vehicle and the operations to be performed include directing the autonomous vehicle by the route to the final curbside destination.

In other embodiments of the method, the operations to be performed include prioritizing the recommended curbside destinations by one or more of the following factors: accessibility, safety, modal preference, vehicle type, demand and peak use, disabled occupant, and number of occupants; the operations to be performed include monitoring in real-time an emergency 911 system; the operations to be performed include tracking a dwell time of the vehicle once the vehicle reaches the final curbside destination; and/or the operations to be performed include billing the customer once the customer either releases the vehicle or vacates the final curbside destination.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing figures:

FIGS. 7a-7d are exemplary user interfaces associated with the curbside management system illustrated in FIGS. 1 and 2.

DETAILED DESCRIPTION

Referring to the figures, the present invention relates to a curbside management system 100 to manage future curbside docking/parking challenges, to improve safety, prioritize accessibility, and optimize the movement of vehicles (connected and/or autonomous vehicles). The management system 100 is designed to allow roadway owners to allocate curbside space efficiently, in real time, based on a combination of market demand and public priorities.

Connected vehicles are vehicles that use any number of communication technologies (such as a mobile device not connected to the vehicle, including a smart phone; and include vehicles used by human drivers with a mobile app of the management system 100 to communicate with the driver, other vehicles on the road, and other infrastructure in or abutting the roadway right of way.

Examples of connected and autonomous vehicles include (but are not limited to) private and publicly owned vehicles, transit vehicles, commercial vehicles, transportation network company vehicles, automobiles, vending trucks, bicycles, scooters, motorcycles, and all other transport technologies and devices moving people, goods/freight, and other purposes.

Figure 1:
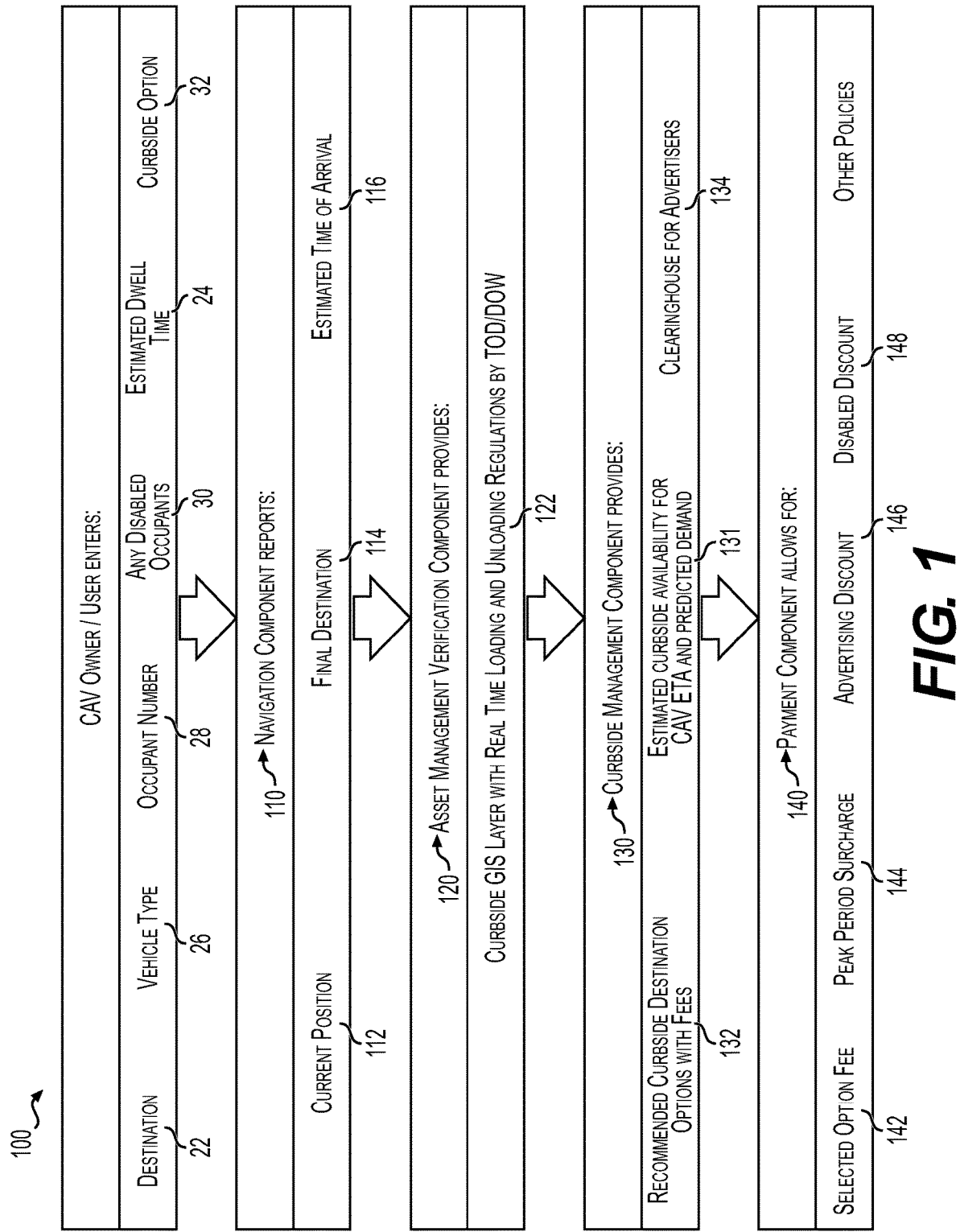
FIG. 1 is a flowchart of illustrating components of a curbside management system in accordance with an exemplary embodiment of the present invention.
Figure 2:
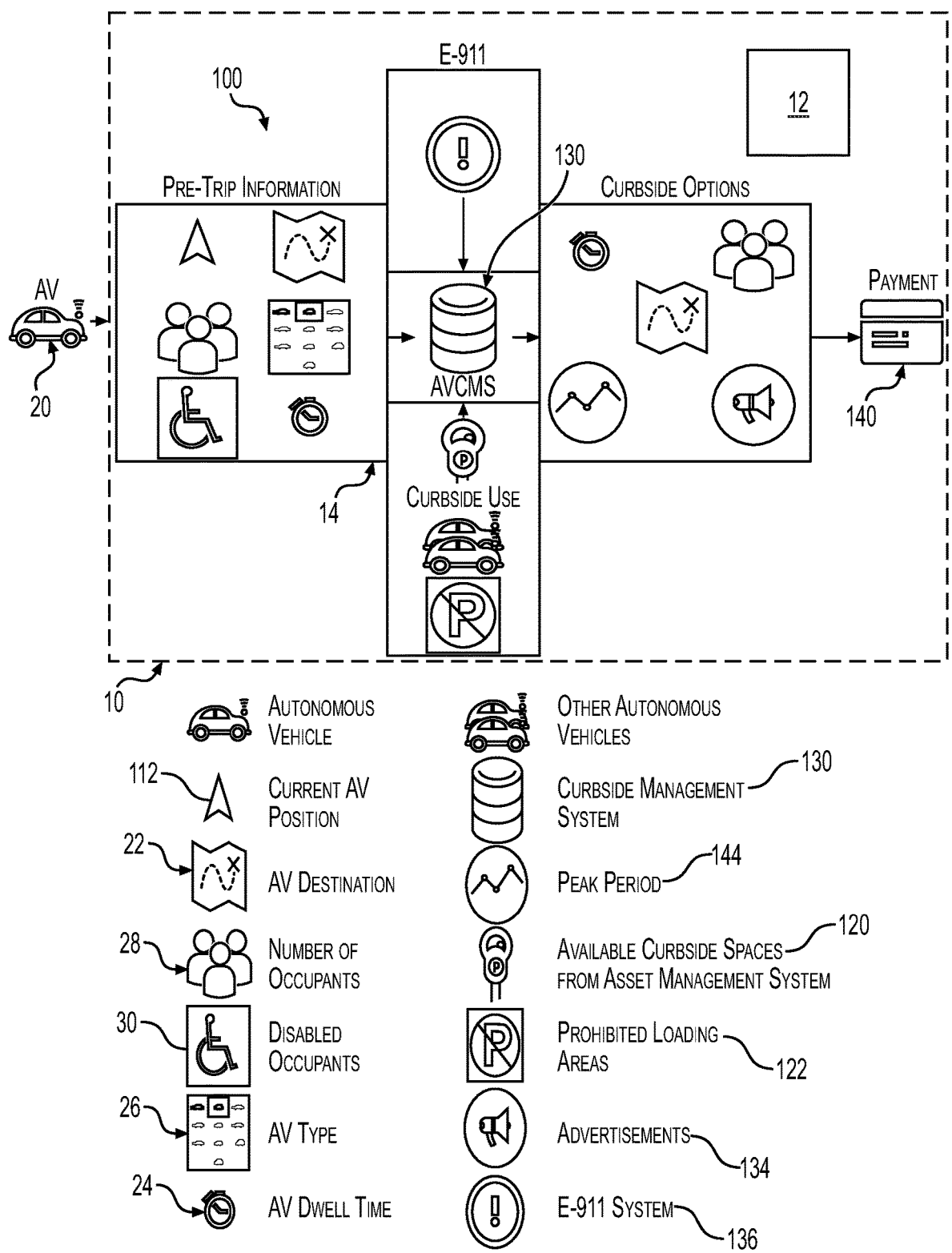
FIG. 2 is a diagram illustrating the curbside management system in accordance with an exemplary embodiment of the present invention.

As seen in FIGS. 1 and 2, the management system 100 comprises one or more computing devices 10 and the computing device 10 has a memory 12 and one or more processors 14 that integrate a number of system components, such as a navigation component 110, an asset verification component 120, a curbside management component 130, and payment component 140, to control in real-time access to limited curbside space and parking facilities by connected and autonomous vehicles and monetize the same. The vehicle 20 may be an autonomous vehicle in wireless communication with the management system 100 or a non-autonomous vehicle connected to the management system 100 through the internet or other network. A customer uses the management system 100 to reserve curbside space for the vehicle that is associated with or owned by the customer.

In general, the management system 100 may be configured to fill the gap between the regulation of the curbside and parking facilities by the infrastructure owner operators, e.g. a private, local, state, or federal jurisdiction, or authority, e.g. a local or regional transportation or parking authority ("owner" or "owners") and curbside space demands by for connected and autonomous vehicles and customers associated therewith; to provide management of short term space rentals or docking fees to limited curbside space or facilities, such as in urban environments; to provide management of curbside and pedestrian zone loading and access where people and vehicles routinely compete for limited space; and/or to provide owners with the real-time ability to control their curbside space under both normal daily activities and in emergencies. Without the curbside management provided by system 100, the curbside, pedestrian zone, and facilities as a resource for all connected and autonomous vehicles would be unnecessarily constrained.

The navigation component 110 may be configured to determine the current position or location 112 of a vehicle, generate a route to the vehicle's final destination 114, and provide an estimated time of arrival 116 at the final destination 114. The navigation component 110 may comprise the controls, or a third party add-on, used to find direction of a person from their location to a particular destination. The navigation component 110 may use a satellite navigation device to get its position data which can then be correlated to a position on a public right-of-way. When directions are needed, routing can be calculated by the navigation component 110. Real-time traffic information can be incorporated to adjust the route and update the arrival time to the destination. Navigation component 110 can also use dead reckoning using distance data for greater reliability, if GPS signal loss and/or multipath occurs due to urban canyons or tunnels. Navigation is based on the shortest path problem, within graph theory, which examines how to identify the path that best meets some criteria (shortest, cheapest, fastest, etc.) between two points in a large network.

The asset verification component 120 may comprise asset information 122 that supports the verification and management of an owner' curb space assets. Curbside assets are defined as any space identified by the curb space owner as suitable for stopping for the purposes of loading or unloading, passenger drop off, parking, or other related purpose based upon the vehicle classification type and characteristics. These assets are found within the public right-of-way (e.g. on street or in the pedestrian zone) as well as privately held properties.

The asset verification component 120 can include an asset registry (e.g. inventory of curbside space assets and their attributes) combined with an electronic maintenance management system and other modules (e.g. inventory or materials management). Assets that are geographically distributed, interconnected or networked, can be represented through the use of geographic information systems (GIS), such as curbside GIS layer or equivalent depicting loading and unloading rules by time of day, day of week, event. The registry of the asset verification component 120 may also include an inventory of curb space that does not include physical assets but possesses a purpose in the use of the space, such as restrictions for safety or disabled access.

Using the asset verification component, the management system 100 can collect and communicate real-time activity at the curb, quantifying the various demands on the curb space area and archive the information for analysis and optimization. The information can be leveraged internal to the owner or exported to other analysis tools. The information can be combined with other travel and smart city data for analysis.

The curbside management component 130 is configured and programmed to allow the curb owner to set and enforce transportation management policies for the connected and autonomous vehicles regarding docking curbside policies. The owner can set modal priorities in the curbside management component 130 that favors high occupancy vehicles, for example. The curbside management component 130 can be configured to respond to emergency calls for service; manage special events, achieve environmental goals; monetize the curbside assets to secure revenue to operate and maintain its infrastructure; manage transportation congestion, including temporal, peak use periods; manage freight deliveries; favor people with disabilities or personal mobility issues; provide options for all vehicle users; and/or manage the availability of curbside spaces. The curbside management component 130 stores and analyzes travel and use patterns to upgrade the transportation system.

The curbside management component 130 using information inputted by the customer and/or extracted from the customer's profile along with other parameters (e.g. emergencies, safety, vehicle priority, and legality, such as regulatory restrictions) and in conjunction with the other system components estimates curbside availability 131 for the vehicle's estimated time of arrival 116, determined by the navigation component 110, and generates recommended curbside destination options 132 for the customer and fees for each option. The curbside management component 130 can be designed to enhance economic vitality through advertisements by providing a clearinghouse 134 for advertisers and proactively managing the curb.

The curbside management component 130 may link to a municipality's emergency system, such as the E-911 system 136, as seen in FIG. 2. A 911 system is configured to support one-way and two-way communication of emergency information between both individuals and groups of individuals and is designed to convey information over multiple types of devices, such as forming a unified communication mechanism for optimizing communications during emergencies. The emergency communication can be capable of both initiating and receiving information between multiple patties. These 911 systems are often made up of both input devices, sensors, and output/communication devices. The origination of information can occur from a variety of sources and locations, from which the 911 system will disseminate that information to one or more target audiences, like the curbside management component of the system 100. The curbside management component 130 can extract emergency information from the 911 system to the management system 100 whether there are any active emergency events that require temporary suspension of curbside activities.

The payment component 140 may be an e-commerce payment system that uses electronic data interchange (EDI) to facilitate the acceptance of electronic payment for online transactions, as is known in the art. As seen in FIG. 1, the payment component 140 is configured to allow for selected option fee 142, peak period surcharge 144, advertising discount 146, a disabled discount 148, and other policies. The payment component 140 of management system 100 may provide curbside options with tiered payment options based upon the customer's pre-trip information, profile, and actual dwell time. The payment options of payment component 140 may also consider other factors, such as existing curbside occupancy rates in the area, how close to final destination is desired, whether arrival is during a peak period, and whether third party advertisement is available.

Using the management system 100, the owner can communicate with smart city technologies and tools; establish, communicate and enforce temporary prohibition zones for docking/parking through the curbside management component for street maintenance, construction, or work in street permits or other emergencies in real-time; establish modal preference (travel options) emphasis priorities through the curbside management component 130 for transit service, bicycle accommodation by time of day (TOD)/day of week (DOW) with parking/docking requests in real-time.

The management system 100 can be configured and programmed to allow the owner to prioritize limited curb space to be the most efficient use thereof or prohibit based upon a set of priorities, which can be determined and entered by the owner. Using the system 100, a connected or autonomous vehicle owner or fleet manager (or customer) can reserve their curbside space in advance, by, for example, requested destination 22 and estimated dwell time 24, type of vehicle trip 26 (e.g. transit vehicle, commercial vehicle, taxi service vehicle, transportation network company vehicle, or private vehicle, etc. as defined above), number of occupants 28, number of disabled occupants 30, and curbside preferences 32, as seen in FIGS. 1 and 2. The management system 100 allows the curb owner to determine how much curbside space is available to customers, in real-time, and where the connected or autonomous vehicle 20 is allowed to use the curbside, such as based upon prescribed traffic regulations 122 to load and unload and prohibited loading areas, through the asset verification and curbside management components 120 and 130 of the system 100.

The management system 100 may prioritize safety through the asset verification component 120 to determine where potential loading and unloading zones 122 would conflict with other transportation users, such as pedestrian crosswalks, fire hydrants, intersection sight distance, and the like. The management system 100 may prioritize operations through the asset verification component 120 to prohibit autonomous vehicles from loading and unloading in transit stops and travel lanes. The management system 100 can be designed to use the navigation and asset verification components 110 and 120 to prioritize access for those with disabilities to lessen the distance from the curbside space to the final destination, including but not limited to locations with ADA accessibility. The management system 100 may report average dwell time by vehicle and vehicle type and project future queue length for other connected or autonomous vehicles and customers at their estimated arrival time. The management system 100 can be designed to allow the owner to adjust their curbside space availability in real-time by event, time of day, day of week, etc. using curbside occupancy rates for payment and/or emergency alerts, for example. In emergencies, the management system 100 can direct the customer's autonomous vehicle 20 away from the danger to safe locations while emergency response teams respond.

The management system 100 may also be configured to generate congestion pricing features for the owner to shape user behavior (e.g. user surcharge for docking with only one occupant during peak period). The management system 100 can allow the owner to adjust incentive pricing for working and non-working autonomous vehicles (i.e. carrying multiple passengers instead of one or no passengers per vehicle or carrying freight instead of being empty). The management system 100 may be configured to the allow an owner to advertise third party services via the clearinghouse 134 and goods as part of curbside management to manage the cost of the reservation fees. The management system 100 can create a revenue stream for activities, such as roadway operations and maintenance.

In an exemplary process of the present invention, in which the autonomous vehicle 20 is wirelessly connected to the curbside management component 100, the customer places a request to the curbside management component 130 with the following information: e.g., preferred destination 22, vehicle type 26 and length, number of occupants 28, and/or the number of disabled occupants 30. The estimated arrival time 116 is supplied by the navigation component 110 with real-time traffic estimation capabilities, and estimated dwell time. The management system 100 then checks the information provided with the availability of curbside spaces using the asset verification component 120 and the anticipated demand from other autonomous vehicle customers at the same estimated time of arrival to meet the needs of the occupants, vehicle type and vehicle length.

Once an estimated legal and/or available curbside space is located by the system 100 in real-time proximate to the requested destination, the curbside management system 100 relays the information to the autonomous vehicle customer with pricing information and other options that may be less proximate to the final destination but a lower price. Concurrently, the curbside management component 130 provides policy oriented incentives, which are determined by the owner, to the customer and associated vehicle or to the fleet manger, that could reduce the curbside fee if the customer elects to pursue. These potential incentives include, but are not limited to, ride sharing, disabled occupant discount, advertisements, a space that is a farther distance from the destination, etc. Once a final price option is selected by the customer, the transaction is reserved in the payment component 140 of the system 100 and the space is reserved for a time that is estimated and updated in real-time as the autonomous vehicle 20 approaches the assigned curbside space using the navigation component 110 and real-time occupancy of existing curbside spaces.

Once the vehicle 20 docks to a curbside space, the payment component 140 charges the customer the agreed upon fee for the dwell time assigned. The curbside management component 130 track's the vehicles dwell time and if it is exceeded by the connected or autonomous vehicle, then additional fees are charged to the customer at specified rates by the owner. If the vehicle 20 carries a disabled occupant, the curbside management system 100 can prioritize the curbside space closest to the final destination 114 in support of the ADA and state/local laws.

The management system 100 can track and record the location, arrival time, dwell time, and departure time of the vehicle 20 based upon the navigation and asset verification components 110 and 120. The curbside management component 130 can be configured to report to other customers and associated vehicles the occupancy rate of occupied curbside spaces in real-time. Legal curbside spaces can be measured and placed in the asset verification component 120 by event, time of day, and day of week which the management system 100 continually updates occupancy rates.

The management system 100 may be configured to allow an owner to, at any time, adjust the asset verification component 120 and/or payment component 140 to control the availability and cost of legal curbside spaces through the curbside management component 130. This feature of the management system 100 can shape the customer's behavior during particular events (e.g. traveling solo during peak hour periods, traveling empty, etc.); and incentivizes efficient transportation by recognizing behaviors that serve the public good (e.g. ride sharing, autonomous vehicles that do work versus empty vehicles). The asset verification component 120 can actively identify prohibited loading and unloading spaces based upon existing safety features (e.g. pedestrian crosswalks, travel lanes, fire hydrants, intersection sight distance, etc.) operations (e.g. transit stops, peak hour congestion pricing, and travel lanes, etc.) and emergencies identified by the local jurisdiction's E-911 system.

Once the curbside space is appropriately priced by the owner, the management system 100 can determine the work performed by each connected or autonomous vehicle to be measured and optimized such that empty (or non-working) vehicles are not taking valuable lane or curbside capacity from working vehicles using the system 100. Working vehicles may, for example, be carrying optimized loads (e.g. passengers or freight) versus a single occupant vehicle, which the system could charge at a higher rate than carpool during peak periods for curbside reservations.

Figure 3:
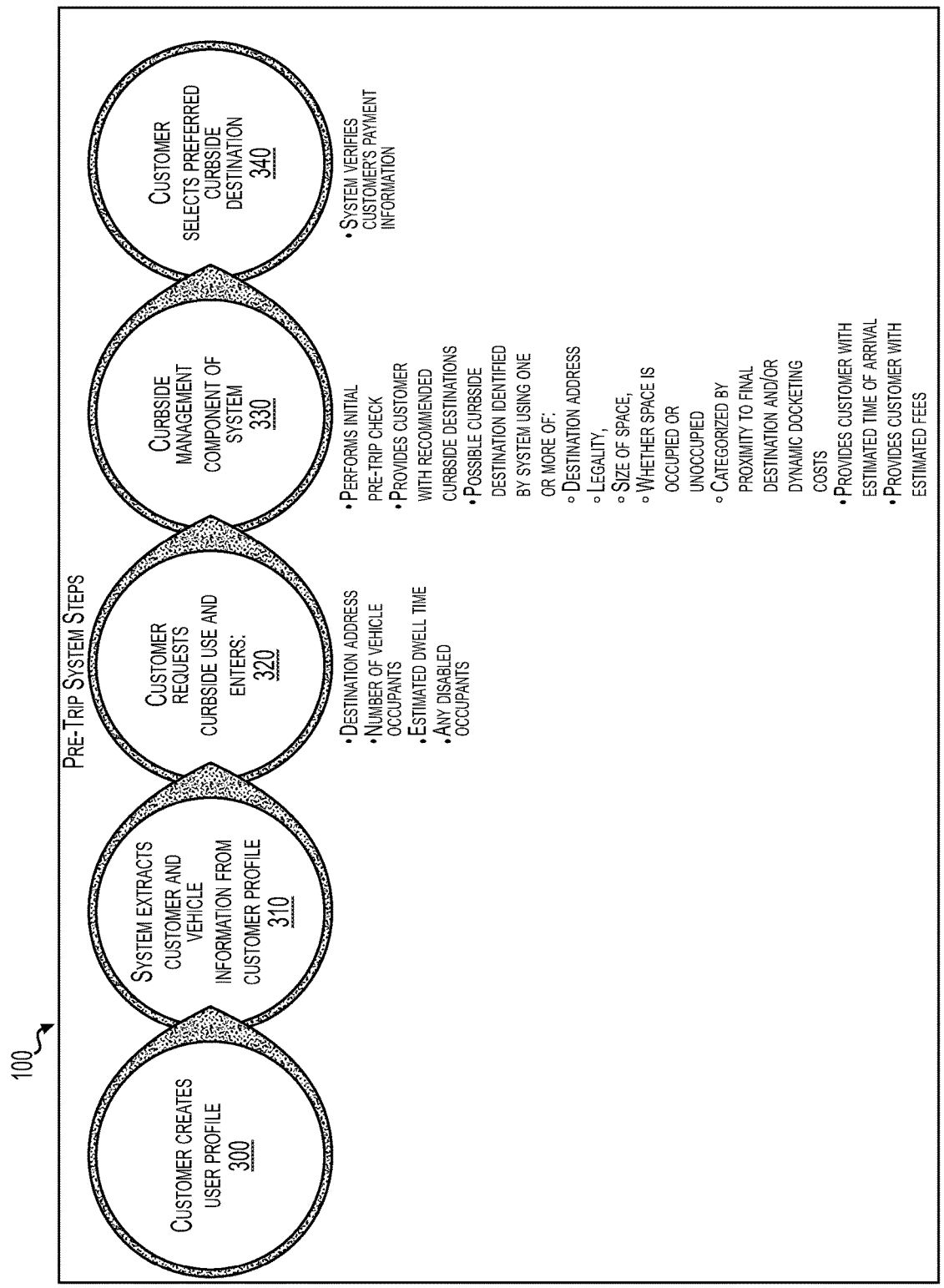
FIG. 3 is a flowchart of exemplary steps executed by the curbside management system illustrated in FIGS. 1 and 2, showing the steps completed prior to a vehicle's trip to a destination.
Figure 4:
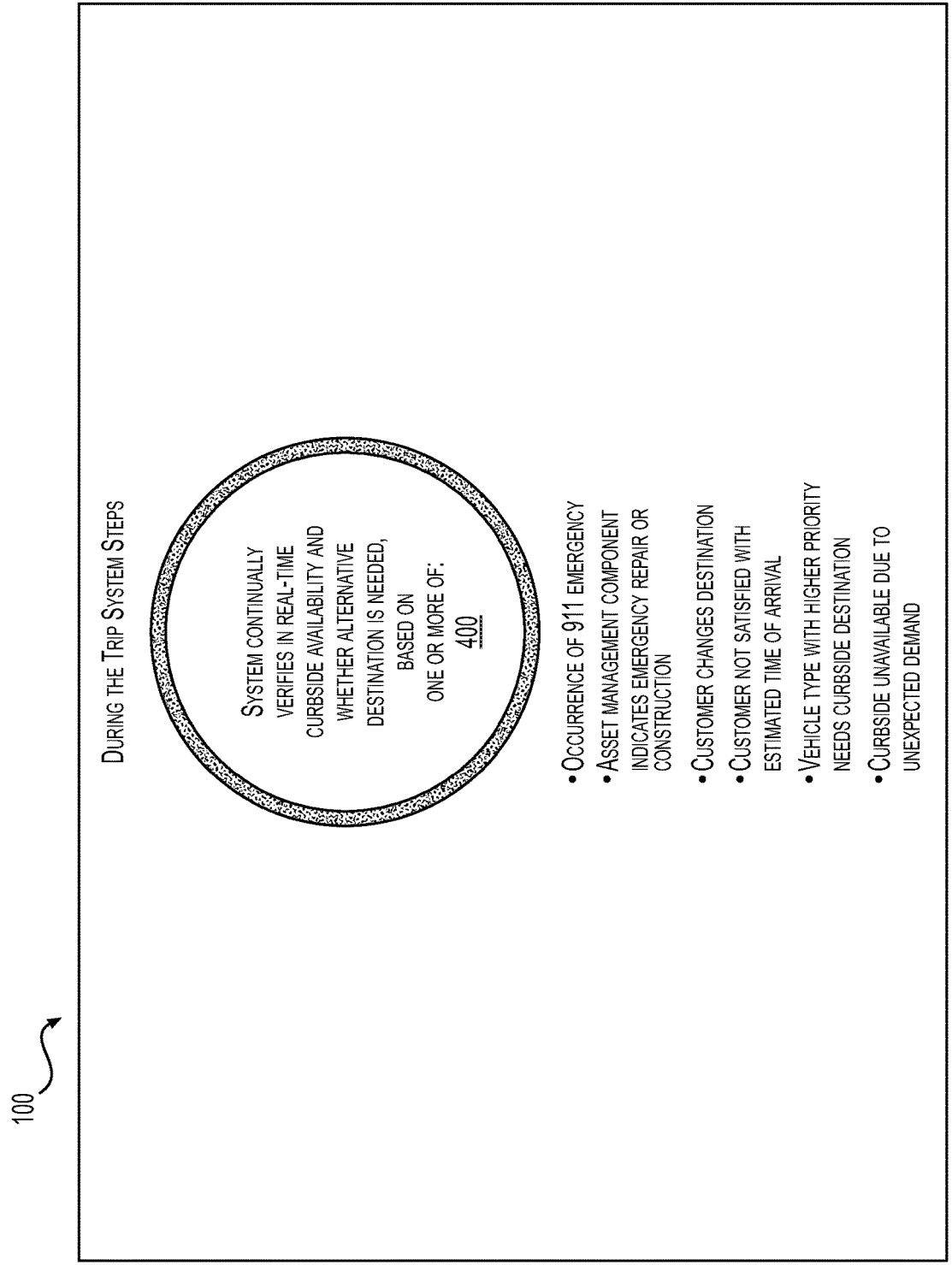
FIG. 4 is a flowchart of exemplary steps executed by the curbside management system illustrated in FIGS. 1 and 2, showing the steps completed during the vehicle's trip to a destination.
Figure 5:
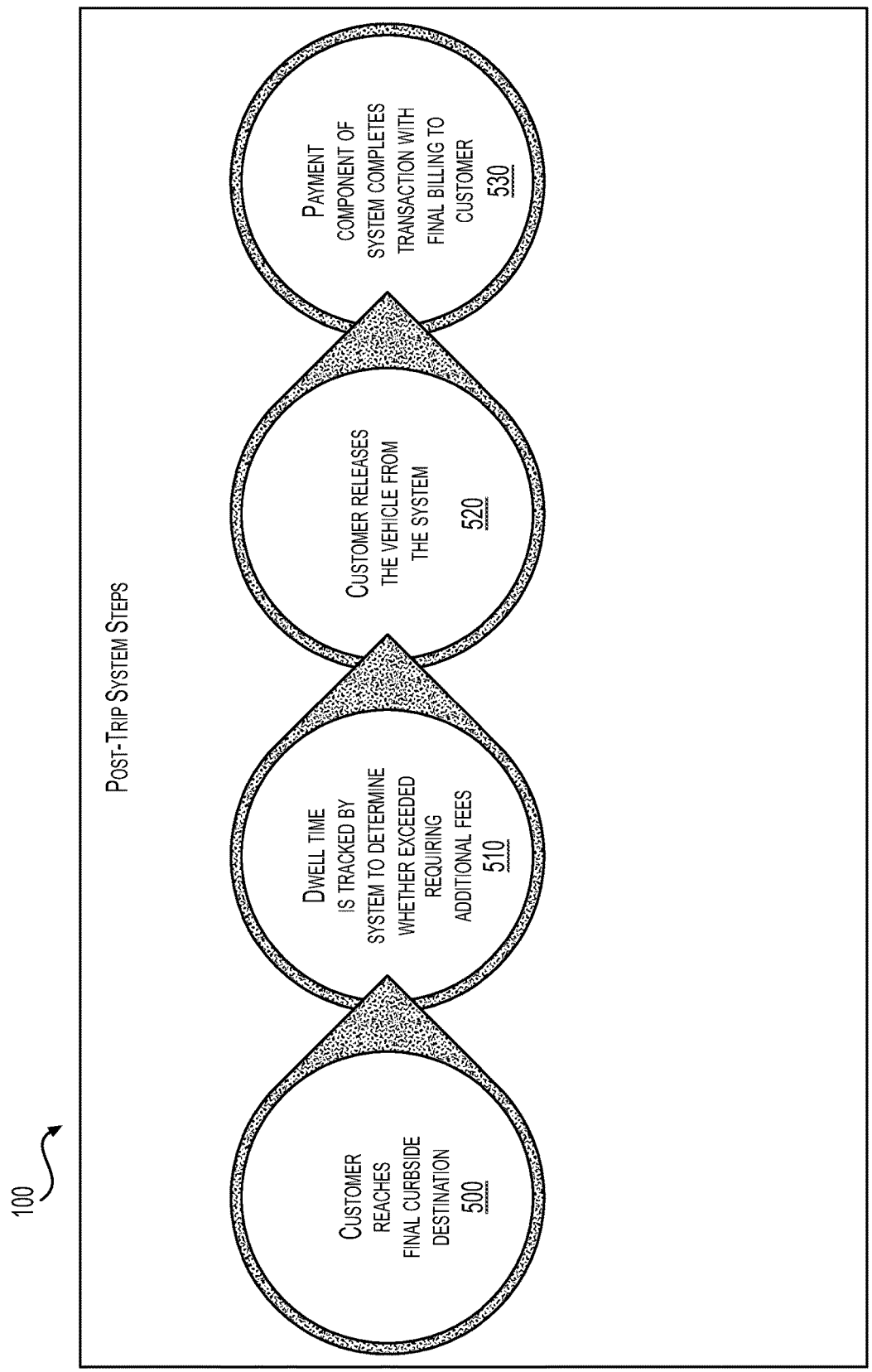
FIG. 5 is a flowchart of exemplary steps executed by the curbside management system illustrated in FIGS. 1 and 2, showing the steps completed after the vehicle's reaches a destination.
Figure 6:
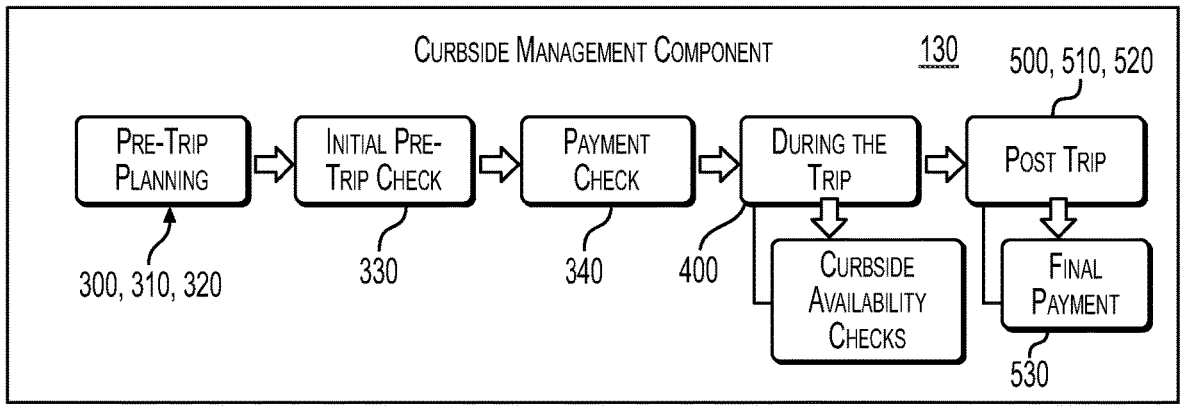
FIG. 6 is a flowchart of a curbside management component of the curbside management system illustrated in FIGS. 1 and 2.
Figure 7A:
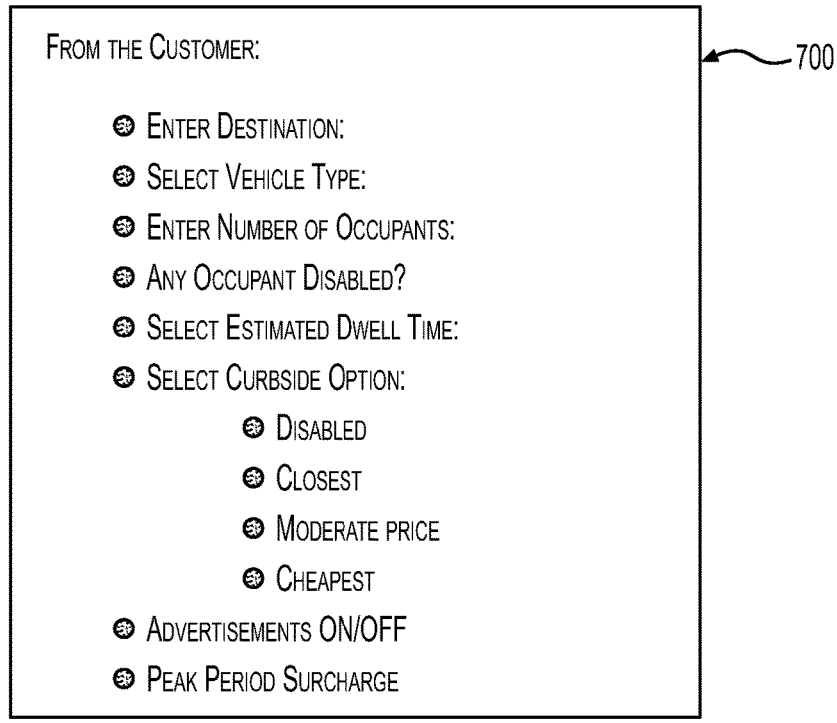
Figure 7B:
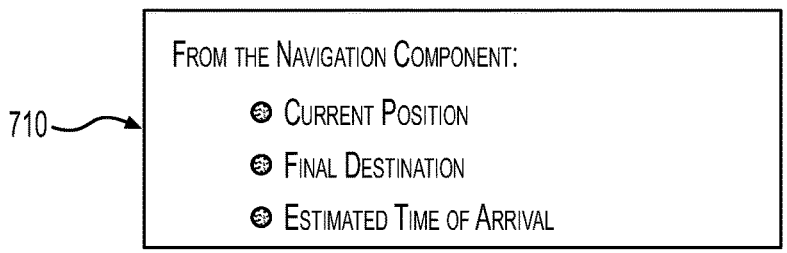

Exemplary steps that the management system 100 executes pre-trip or prior to vehicle travel to the final destination are illustrated in FIG. 3, during the trip or travel of the vehicle to the final destination are illustrated in FIG. 4, and post-trip or after the vehicle reaches the final destination are illustrated in FIG. 5. As seen in FIG. 6, the curbside management component 130 operates in each of the pre-trip, during the trip, and post-trip steps.

Pre-Trip System Steps

Each customer creates a user account with a customer profile including preferences at step 300. The customer's profile may include identification of the vehicle type and characteristics associated with that make and model of vehicle 20 (e.g. length, width, height, etc.). The owner can prioritize vehicle types in the management system through policy (e.g. transit vehicle is able to displace other vehicle types along the curb to access an identified transit loading area, a service vehicle or emergency vehicle is able to displace other vehicle types when there is a request for emergency services). Each customer account can store information regarding their associated vehicle 20 or vehicles (e.g. fleet manager) including:

Personal information (e.g. name, address, contact information, log in, password, etc.)
Company information (e.g. name, address, contact information, tax identification, vehicle licensure, etc.)
Vehicle information (license plates, vehicle registration, safety inspections, maintenance records or certifications, personal property tax, etc.)
Insurance information (e.g. vehicle insurance company, policy number, coverage, etc.)
Fleet size (e.g. 1-3 vehicles, 4-10 vehicles, 11-50 vehicles, 51-500 vehicles, 501+ vehicles, etc.)

Each customer account can store information for convenience and ease of use:

Personal information (e.g. name, address, gender, contact information, log in, password, etc.)
Disabilities (e.g. wheel chair bound, elderly, learning, blind or visually impaired, etc.)
Payment information (e.g. credit or debit card, etc.)
Favorite trips (e.g. work, home, place of worship, school, store, etc.)
Vehicle classification type for each vehicle owned (e.g. delivery truck, bus, passenger vehicle, emergency vehicle, etc.)
Favorite range of potential docking locations to search from address (e.g. 1 minute walk, 5 minute walk, 10 minute walk)

All information in the customer's account (e.g. trip information and preferences, etc.) is available to the management system 100 for extraction at step 310 and available to the owner to make improvements in planning, operating, designing, maintaining and constructing their infrastructure.

Customer Request Curbside Use—Step 320

For each trip, the customer requests curbside use at step 320 and enters the following information via computer, smart phone or equivalent:

Destination 22—the customer can select from favorite trips or input via voice or typing an address or destination that would be associated with an address and mapping software would allow the selection of the destination as an end point)
Occupant number 28—the customer provides the number of occupants such that an appropriately sized vehicle can be sent to the customer's current location or origin of the trip)
Any Disabled Occupants 30—if the customer is disabled or carrying another disabled individual, the customer can be identified to receive any policies set by the owner that may benefit the transport of disabled persons (e.g. lower cost trip, better curbside location closer to ADA accessible facilities, etc.)
Estimated Dwell Time 24—the customer would select from a menu of choices approved by the owner from a drop down menu to set time limits for a vehicle to set on the curb for the origin and the destination (e.g. pick-up/drop-off passengers—2 minute dwell time, load groceries—5 minute dwell time, deliver parcels to office building—20 minute dwell time, manual entry, etc.)
Curbside Options 32—the customer would select from a menu of choices approved by the owner from a drop down menu and decide how close and how costly they would like to be delivered to their destination (e.g. closest, cheapest, ADA accessible, balance between closest and cheapest etc.). Based upon factors set by the owner in the system related to demand and environmental considerations etc., the owner can also present any fees associated with policies set by the owner (e.g. peak period surcharge for single occupancy, high occupancy vehicle discounts, etc.)

Advertisement Feature 134—the customer could elect to turn the advertisement feature on or off. If the advertisement feature is on, then the owner could elect to defray some or all of the travel costs through the collection of additional revenues from advertisers. If the advertisement feature is off, there would be no additional advertisement discount from the owner.

Curbside Management System—Initial Pre-Trip Check—Step 330

For each trip, the curbside management component 130 performs an initial pre-trip check at step 330 to include:

Customer initial location or origin 112 checked

Customer pick-up location and distance from initial location or origin checked and verified Customer final destination 114 checked Estimated time of arrival 116 checked based upon real time traffic and a selected vehicle route from origin to destination, including the time it takes the vehicle to arrive at the origin and load (e.g. if there is more time needed for estimated dwell time for disabled or parcel loading, then that is noted and accounted for in the ETA calculations)

Destination check with the asset verification component 120 to provide available curbside options for docking at destination 132 as the customer requested (e.g. closest, cheapest, ADA accessible, balance between closest and cheapest etc.)

For each trip, the curbside management component 130 provides an initial recommendation for curbside destinations with fees at step 330. The customer may select the first option or continue to search for the next best option that suits their user preferences while enforcing the owner's policies (e.g. disabled benefits, peak period surcharge for single occupancy, high occupancy vehicle discounts, advertisement discounts, etc.) Possible curbside destinations are discovered from the destination address 22 or point on a map. The recommended curbside destinations 132 are checked for legality, width, length using the asset verification component 120. Legality is verified with a rules layer that identifies where stopping is allowed and prohibited (e.g. intersection sight distance, crosswalk, fire hydrant, time of day or day of week restrictions, peak hour restrictions, clear width sidewalk, driveway entrances, etc.) Docking height, length and width restrictions etc. can be verified against the known dimensions of the vehicle type identified in the pre-trip planning phase.

The curbside management component 130 can also check whether the curbside spaces are occupied, pending availability or unoccupied. Occupied curbside spaces can be shown with windows of anticipated openings by minutes based upon the vehicle estimated time of arrival (e.g. this feature is particularly important for ADA accessible curbside spaces when accommodating disabled or mobility impaired occupants or blind/visually impaired occupants). Occupied curbside spaces can be shown as anticipated to be available based upon existing reservations and historic use by event and time of day/day of week models. Unoccupied curbside spaces can be shown as available based upon the vehicle estimated time of arrival and upon reservations and historic use by event and time of day/day of week models. Because the curbside management system 100 is a dynamic reservation based system, the customers receive updated, real-time information as anticipated dwell times become real dwell times. Each customer has a history of how their estimated dwell times compare to their actuals so there would be an additional machine learning opportunity for the component 130 to increase accuracy of dwell times over time.

The curbside management component 130 can categorize the recommended curbside destinations by factors, such as proximity to the requested destination 22, ADA accessibility, cheapest within a set walking distance (e.g. 1 minute walk, 5 minute walk, 10 minute walk), is a special case (e.g. some incentives for special events). Dynamic docking costs can be checked using incentives and disincentive policies set by owner in the system 100.

Customer Curbside Selection—Payment Check—Step 340

For each trip, the customer selects at step 340 their preferred option of the curbside destinations recommended by the curbside management component 130 based upon curbside availability and itemized costs in the pre-trip check. The customer's payment information is verified with a hold placed on their account until the trip is complete. Once payment information is verified, the customer's trip begins with the vehicle called to the agreed trip origin (or the customer drives the vehicle). The customer locates the vehicle and loads the vehicle for the initial estimated dwell time for loading. The dwell time of the vehicle is tracked and reported by the system 100. The owner uses set policies in the system 100 for dwell time and if the dwell time is exceeded, then an additional dwell time charge is assessed in increments set by the owner. The vehicle 20 can then depart towards the selected curbside destination, which is the final destination 114.

During the Trip System Steps

For each trip, the management system 130 continually updates at step 400 (FIG. 4) to verify the curbside availability with and if a different destination is required, including but not limited to, the following reasons:

The E-911 system indicates that an emergency has occurred at the originally selected curb; therefore, the vehicle would have to locate a curbside space outside of an emergency zone to complete the trip.

The asset management component 120 indicates that there is an emergency repair that service vehicles need access to (e.g. a water main bursts, a pothole repair, a traffic control device repair, etc.); therefore, the vehicle would have to locate a curbside space outside of an emergency zone to complete the trip.

The customer decides to change their destination based upon an advertisement incentive for a different location and a different curbside space is needed.

The estimated time of arrival does not meet the customer's tolerance and a different curbside space is needed.

The curbside management component 130 offers a different curbside option and fee because amount of curbside availability has changed significantly due to higher than expected curbside dwell times.

There is a vehicle type with a higher occupancy or priority (e.g. transit vehicle or high occupancy vehicle, etc.) that needs the curbside space therefore, the vehicle would have to locate a curbside space outside of this higher priority curb zone to complete the trip.

Post-Trip System Steps

For each trip, once the customer reaches the docked curbside space or final destination 114 at step 500, the dwell time of the vehicle 20 is tracked and reported by the system at step 510. The owner can use set policies for dwell time and if the dwell time is exceeded, then an additional dwell time charge is assessed in increments set by the owner. The customer releases the vehicle from the owner's service at step 520. The payment component 140 then completes the transaction at step 530 with a final billing to include any additional dynamic charges (e.g. single occupant surcharge, peak period surcharge, exceeded dwell time penalty, illegal loading, etc.) or incentives (high occupancy credit, disabled person credit, advertiser's credit). The vehicle can then return to service to address the next origin/destination trip of another customer or the customer's driving the vehicle can vacate the curbside space.

In an exemplary scenario of the curbside management system 100 in use, Maria is the customer and she is handicapped and lives in a metropolitan city. While she is wheelchair bound, she travels with ease through her city because she has access to the city's curbside management system 100. FIGS. 7*a*-7*d* illustrate exemplary user interfaces 700, 710, 720, and 730 of the city's system 100 that Maria may use. Because she qualifies for disabled status, she receives discounted trips for her work trips through adopted city policy programmed into the management system 100. The management system 100 also knows where the best ADA accessible curbside spots are available. Maria makes a reservation by logging into the management system's mobile app using her customer profile with her payment information and inputting the time she needs to arrive at her favorite destinations (saved in her customer profile) and the management system 100 finds the best accessible location and its availability. The management system 100 knows that Maria needs extra time to get in and out of the vehicle so it automatically increases the curbside dwell time to meet her needs. After she is in the ADA accessible vehicle that arrives in front of her apartment, Maria realizes that she needs to pick up a work package. She is able to perform her job at a high level because her mobility is more reliable and seamless with management system 100. The management system 100 adapts in real-time and finds a curbside directly in front of the post office to wait for her package. The management system 100 accommodates Maria's request for a lower dwell time at the post office as she was not getting out of the vehicle this time. On to work, the management system 100 has her vehicle rescheduled for a new time to be at the accessible curb in front of her workplace. To insure safe delivery, she requests the management system 100 to have a parcel delivery machine greet her so that she may exit and load her package into the delivery robot. The management system 100 coordinates both dwell times at the accessible curb which allows Maria to get to work in time. The management system 100 bills Maria and her payment to the city is made to both vehicle services and includes the cost of her dwell time at the curb to the city plus any discounts, (e.g. her disability status), and any surcharges, (e.g. a peak period single occupancy trip). The management system 100 guarantees a seamless and flexible trip where the curbside is always open because it is monetized and managed. Without the management system 100, the curbside would be full of parked electric connected/autonomous vehicles and Maria would have had no access.

In another scenario of the curbside management system being used, the owner is a city for which Francine is the Director of Transportation. Her boss is the City Manager and he has orders from City Council to resolve congestion in the AM and PM peak period. Too many vehicles are taking up travel lanes and curbside spaces. Francine recommends the curbside management system 100 to operate the transportation system. City Council approves the use of the system 100 and decides to institute a policy through the system 100, which is a peak period single occupant surcharge on all vehicles docking in downtown between 6 AM to 9 AM and 4 PM to 6 PM. Many customers who used to commute solo decide to check the carpool feature on their system 100 reservation requests and this reduces congestion by 25% and preserves mobility.

Embodiments of the present invention relate generally to connected and autonomous vehicles and associated mechanical, electrical and electronic hardware, computing software, including autonomy applications, image processing applications, etc., computing systems, and wired and wireless network communications to facilitate autonomous control of vehicles, and, more specifically, to systems, devices, and methods for curbside management of connected and autonomous vehicles.

The connected and autonomous vehicles curbside management system of the present invention may be a system, process, apparatus, user interface, and/or series of program instructions on a computer readable medium, such as a computer readable storage medium or a computer network where the program instructions are sent over optical, electronic, or wireless communication links.

While particular embodiments have been chosen to illustrate the invention, it will be understood by those skilled in the art that various changes and modifications can be made therein without departing from the scope of the invention as defined in the appended claims.

What is claimed is:

1. A method for managing or regulating curbside use by vehicles, the method comprising:
   providing a communication system configured to communicate with one or more vehicles associated with one or more customers;
   executing instructions of one or more computing devices, each computing device having at least one memory and at least one processor, the at least one processor being in communication with the one or more customers via the communication system, the at least one processor being configured to perform the following operations:
   prompting a customer of the one or more customers to request curbside use of a curbside space, in which the customer inputs at least a destination address and an estimated dwell time for a connected vehicle associated with the customer,
   dynamically prioritizing allocation of the curbside space based upon a predetermined set of priorities determined by an owner or operator of the curbside space, the predetermined set of priorities including a plurality of the following factors: ADA accessibility, safety, emergency response, modal preference, vehicle type or size dimensions, demand and peak use, disabled occupant, revenue generation, and number of occupants, and
   the dynamically prioritizing of the allocation of the curbside space including prohibiting allocation of the curbside space based on prohibition zones of the curbside space,
   generating available curbside access destinations of the curbside space based at least in part on the destination address, the estimated dwell time, and on the dynamic prioritization of the allocation of the curbside space including prohibiting allocation of the curbside space based on prohibition zones thereof, and generating an estimated fee for each of the available curbside access destinations,
   communicating the available curbside access destinations and the estimated fees to the customer, prompting the customer to reserve one of the available curbside access destinations as a reserved curbside destination, and generating a route from a current location of the connected vehicle to the reserved curbside destination, wherein the connected vehicle is moved from the current location to the reserved curbside destination via the route.

2. The method of claim 1, wherein the dynamically prioritizing of the curbside space is based upon a combination of the plurality of factors of the predetermine set of priorities.

3. The method of claim 2, wherein the customer of the one or more customers requesting curbside use of the curbside space, inputs a number of occupants of the connected vehicle associated with the customer, and the dynamically prioritizing of the allocation of the curbside space includes the number of occupants being greater than one.

4. The method of claim 1, wherein the operations to be performed include verifying in real-time the availability of the reserved curbside destination while the connected vehicle is preparing to travel or is in route thereto; and determining an alternative curbside destination if the reserved curbside destination is not available.

5. The method of claim 1, wherein the operations to be performed include setting and enforcing transportation management policies and priorities of the owner or operator.

6. The method of claim 1, wherein the operations to be performed include tracking a dwell time of the connected vehicle once the connected vehicle reaches the reserved curbside destination.

7. The method of claim 6, wherein the operations to be performed include charging the customer of the one or more vehicles with an additional fee or penalty if the dwell time thereof at the reserved curbside destination exceeds an assigned dwell time that has been assigned to the connected vehicle.

8. The method of claim 1, wherein the connected vehicle is an autonomous vehicle and the operations to be performed include directing the autonomous vehicle by the route to the reserved curbside destination.

9. The method of claim 1, wherein the operations to be performed include billing the customer once the customer either releases the connected vehicle or vacates the reserved curbside destination.

10. The method of claim 1, wherein the operations to be performed include monitoring in real-time an emergency 911 system and prioritizing emergency vehicles use of the curbside space by prohibiting allocation of the curbside space by the connected vehicle of the customer when generating the available curbside access destination.

11. The method of claim 1, wherein the at least one processor integrates at least a navigation component, an asset verification component, and a curbside management component, configured to generate the available curbside access destinations of the curbside space which are communicated to the one or more customers via the communication system for selection of one of the available curbside access destinations as the reserved curbside destination for docking the one or more vehicles, the instructions comprising, collecting and communicating to the curbside management component real-time docking activity of the curbside space;

quantifying any customer demands on the docking use of the curbside space; and archiving the information for analysis and optimization by the curbside management component.

12. The method of claim 1, wherein the at least one processor calculating fees or penalties associated with one or more of the available curbside access destinations and the reserved curbside destination.

13. The method of claim 12, further comprising charging for one or more of a selected option fee, a peak period surcharge, a non-working autonomous vehicle surcharge, a violation penalty, an advertising discount, or a disabled discount.

14. The method of claim 1, wherein the vehicle is an autonomous vehicle and the processor is in communication with a controller of the autonomous vehicle to direct the autonomous vehicle to the reserved destination via the route.

15. The method of claim 1, wherein the vehicle is a non-autonomous vehicle and the customer communicates with the processor via a mobile device, smart phone or computer.

16. The method of claim 1, wherein the set of priorities include one or more of commercial vehicle restrictions or legal restrictions.

17. The method of claim 1, further comprising communicating with an emergency system and recommending curbside destinations based at least in part on information received from the emergency system or a work in street permit system that monitors work zones, or special events.

18. The method of claim 1, further comprising collecting and communicating real-time activity at the curbside space, quantifying any customer demands on the use of the curbside space, and archiving the information for analysis and optimization by a curbside management component of the at least one processor.

19. The method of claim 1, further comprising setting and enforcing transportation management policies of the owner or operator.

20. The method of claim 1, further comprising tracking a dwell time of the vehicle once the vehicle reaches the reserved curbside destination.

21. The method of claim 20, further comprising charging the customer of the one or more vehicles with an additional fee or penalty if the dwell time thereof at the reserved curbside destination exceeds an assigned dwell time that has been assigned to the vehicle.

22. The method of claim 1, wherein the prohibition zones are based upon pedestrian crosswalks, fire hydrants, intersection sight distance, transit stops, peak hour traffic congestion, or emergencies identified by a local jurisdiction's E-911 system.

* * * * *